United States Patent
Büttner et al.

(10) Patent No.: US 12,250,092 B2
(45) Date of Patent: Mar. 11, 2025

(54) DATA TRANSMISSION METHOD, SEGMENT TELEGRAM AND AUTOMATION COMMUNICATION NETWORK

(71) Applicant: Beckhoff Automation GmbH, Verl (DE)

(72) Inventors: Holger Büttner, Verl (DE); Dirk Janssen, Verl (DE); Erik Vonnahme, Salzkotten (DE); Guido Beckmann, Verl (DE); Thomas Rettig, Rheda-Wiedenbrück (DE); Thorsten Bunte, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 470 days.

(21) Appl. No.: 17/693,515

(22) Filed: Mar. 14, 2022

(65) Prior Publication Data
US 2022/0209985 A1   Jun. 30, 2022

Related U.S. Application Data

(63) Continuation of application No. PCT/EP2020/074631, filed on Sep. 3, 2020.

(30) Foreign Application Priority Data

Sep. 23, 2019   (DE) ..................... 10 2019 125 545.7

(51) Int. Cl.
*H04L 12/40*   (2006.01)
*H04L 45/74*   (2022.01)

(52) U.S. Cl.
CPC ........ *H04L 12/40163* (2013.01); *H04L 45/74* (2013.01)

(58) Field of Classification Search
CPC ....... H04L 12/40163; H04L 2012/4026; H04L 45/74
See application file for complete search history.

(56) References Cited

U.S. PATENT DOCUMENTS 5,497,371 A   3/1996   Ellis et al.
8,179,923 B2   5/2012   Krause
(Continued)

FOREIGN PATENT DOCUMENTS

DE   10018136 A1   10/2001
DE   102014112082 A1   2/2016
(Continued)

OTHER PUBLICATIONS

"EtherCAT—the Ethernet Fieldbus," EtherCAT Technology Group, Nov. 2012, 21 pages.
(Continued)

*Primary Examiner* — Alpus Hsu
*Assistant Examiner* — Hooman Houshmand
(74) *Attorney, Agent, or Firm* — Dorsey & Whitney LLP (57) ABSTRACT

In an automation communication network, a distribution node is provided with a plurality of input/output interfaces, each connected to a network segment having at least one subscriber. The network segments are each assigned segment telegrams for processing by the subscriber. The segment telegrams have a data field with sequence information indicating the priority of a subsequent segment telegram. The distribution node is configured to receive the segment telegram on an input/output interface and transmit it according to a routing specification on a further input/output interface. The distribution node blocks the input/output interface on which the segment telegram has been transmitted for further transmission if the telegram sequence information indicates a priority for the subsequent segment
(Continued)

telegram with the same routing specification, which is higher than the priority of other telegrams intended for transmission on the input/output interface, in order to send the subsequent segment telegram on the blocked input/output interface.

11 Claims, 4 Drawing Sheets

(56) References Cited

U.S. PATENT DOCUMENTS

| | | | |
|---|---|---|---|
| 8,406,248 B2 * | 3/2013 | Pratt, Jr. | H04W 56/002 370/444 |
| 10,965,492 B2 | 3/2021 | Meier et al. | |
| 11,050,585 B2 | 6/2021 | Bunte et al. | |
| 2002/0110155 A1 | 8/2002 | Pearce et al. | |
| 2005/0058149 A1 | 3/2005 | Howe | |
| 2006/0109866 A1 | 5/2006 | Janssen et al. | |
| 2013/0124763 A1 | 5/2013 | Kessler | |
| 2020/0244480 A1 * | 7/2020 | Bunte | H04L 12/40163 |

FOREIGN PATENT DOCUMENTS

| | | |
|---|---|---|
| DE | 102017125086 A1 | 5/2019 |
| DE | 102017130547 A1 | 6/2019 |
| EP | 2501079 A1 | 9/2012 |
| EP | 2140616 B1 | 11/2017 |
| WO | 9512265 A1 | 5/1995 |
| WO | 0074305 A2 | 12/2000 |
| WO | 2009121087 A1 | 10/2009 |
| WO | 2019081230 A1 | 5/2019 |

OTHER PUBLICATIONS

Office Action dated Mar. 6, 2023 in connection with Chinese patent application No. 202080066448.7, 15 pages including English translation.

Office Action dated Jul. 15, 2020 in connection with German Patent Application No. DE 10 2019 125 545.7, 8 pages including English translation.

International Search Report and Written Opinion dated Aug. 12, 2020 in connection with International Patent Application No. PCT/EP2020/074631, 22 pages including English translation.

* cited by examiner

DATA TRANSMISSION METHOD, SEGMENT TELEGRAM AND AUTOMATION COMMUNICATION NETWORK

CROSS-REFERENCE TO RELATED APPLICATIONS

This patent application is a continuation of International Patent Application PCT/EP2020/074631 filed 3 Sep. 2020, entitled DATA TRANSMISSION METHOD, SEGMENT TELEGRAM AND AUTOMATION COMMUNICATION NETWORK, which claims the priority of German patent application DE 10 2019 125 545.7 filed 23 Sep. 2019, entitled DATENÜBERTRAGUNGSVERFAHREN, SEGMENT-TELEGRAMM UND AUTOMATISIERUNGSKOMMUNIKATIONSNETZWERK, each of which is hereby incorporated by reference, in the entirety and for all purposes.

FIELD

The present invention relates to a method for transmitting data in an automation communication network. The invention further relates to a segment telegram and to an automation communication network.

BACKGROUND

A so-called "local area network" is a spatially limited network in which various network components, also referred to as subscribers in the following, are coupled with one another. The network components may be one or a plurality of servers and work subscribers, referred to as nodes, which are connected to one another via communication lines in the form of coaxial, fiber optic or twisted pair cables. Communication between the network components within the LAN is based on network protocols.

The Ethernet protocol is the most widely used LAN network protocol. Ethernet telegrams may comprise a user data block with a length of 1500 bytes and enable telegram transmission rates between the individual nodes within the LAN of several gigabytes/second, wherein the telegrams are transmitted in a packet-oriented manner. The Ethernet protocol is also used in automation technology as the so-called "Industrial Ethernet".

The communication networks used in automation technology are usually so-called field-bus systems. Field-bus systems are bus systems in which decentrally arranged devices of a machine periphery, such as input and/or output modules, drives and operating terminals, are connected to control units via the field-bus system. A common transmission channel, e.g. in the form of a cable or a radio link, is available for transmitting data.

Data exchange between subscribers via the field bus is mostly based on the master-slave principle. The control units on the field bus are the active bus subscribers in the following, also referred to as master subscribers. They have bus access authorization and determine the data transfer on the field bus. The passive subscribers, also referred to as slave subscribers in the following, are usually the machine peripherals. They do not have bus access authorization and may only acknowledge received data or transmit data at the request of a master subscribers.

Master-slave networks are often embodied as ring bus systems, wherein the network forms a physical string from the point of view of the master subscriber and the telegrams are passed through by all slave subscribers. In order to limit the pass-through time of the telegrams in communication networks having a plurality of subscribers and thus to be able to guarantee the real-time capability required for control tasks in automation technology, the communication networks are often structured hierarchically using distribution nodes, referred to as switches.

The distribution node has a plurality of input/output interfaces via which network segments may be integrated into the communication network in parallel. The distribution node checks each telegram received on an input/output interface for the address of the addressed subscriber and then forwards the telegram to the addressed subscriber via the assigned input/output interface to which the network segment with the subscriber is connected. The telegrams assigned to the individual network segments are also referred to as segment telegrams in the following.

The distribution nodes usually operate according to the FIFO principle, in which those telegrams that were received first are also re-sent first. However, this prevents reliable real-time processing of the telegrams. Thus, more current distribution nodes often support so-called VLAN tagging, which may be used to prioritize individual segment telegrams when they are sent, thus ensuring real-time capability in the automation network.

In VLAN tagging, the segment telegrams comprise a tag field in the header section, also referred to as the header in the following, which contains priority information. When the segment telegram is received, the distribution node evaluates the tag field with the priority information and forwards the segment telegram before other segment telegrams if the indicated priority is higher than that of the other segment telegrams. The distribution node may be embodied in such a way that the distribution node cancels or interrupts the transmission of a segment telegram on an input/output interface in order to send a segment telegram with a higher priority instead.

Even with this procedure, however, there is still the problem that high-priority segment telegrams are forwarded with a delay. Canceling or interrupting the transmission of a low-priority segment telegram leads to a transmission delay until the high-priority segment telegram may be sent. Furthermore, the distribution node may only determine the priority of the segment telegram after receiving the tag field by means of the priority information in the segment telegram, in order to then stop the transmission process of a low-priority segment telegram on the input/output interface, as the case may be. There is also a delay in forwarding a sequence of high-priority segment telegrams. There is always a transmission pause between the successive high-priority segment telegrams, which is specified by the network protocol. The continuous forwarding of the successive high-priority segment telegrams by the distribution node may then be interrupted if the distribution node has already started the transmission process for a low-priority segment telegram temporarily stored in the distribution node during the transmission pause. The distribution node then has to cancel or interrupt the transmission of the low-priority segment telegram before it may start transmission of the next high-priority segment telegram.

SUMMARY

The invention provides an improved method for transmitting data in an automation communication network, an improved segment telegram and to an improved automation communication network.

According to a first aspect, a method for transmitting data in the form of telegrams in an automation communication network comprises at least one distribution node comprising a plurality of input/output interfaces each communicating with a network segment, wherein each network segment comprises at least one subscriber, where the individual network segments are each assigned segment telegrams for processing by the subscriber in the network segment, where priorities are assigned to the segment telegrams, wherein the segment telegrams each have a data field which is embodied to contain telegram sequence information indicating which priority a subsequent segment telegram from the network segment has, wherein the distribution node is embodied to receive the segment telegram on an input/output interface and to transmit it according to a routing specification on a further input/output interface, wherein the distribution node blocks the input/output interface on which the segment telegram was sent for a further send operation if the telegram sequence information assigned to the sent segment telegram indicates a priority for the subsequent segment telegram from the network segment with the same routing specification, the valence (or value) of which is higher than the valence (or value) of the priority of telegrams which are present in the distribution node and are intended for transmission on the input/output interface, in order to send the subsequent segment telegram on the blocked input/output interface after receipt of the subsequent segment telegram from the network segment with the same routing specification.

According to a second aspect, a segment telegram comprises a header section, a data area, and an end section, wherein the end section comprises a data field indicating the priority for the subsequent segment telegram on the network segment.

According to a second aspect, an automation communication network comprising a plurality of network segments each having at least one subscriber, wherein the individual network segments are each assigned segment telegrams for processing by the subscriber in the network segment, wherein priorities are assigned to the segment telegrams, wherein the segment telegrams have a data field embodied to comprise a telegram sequence information indicating which priority a subsequent segment telegram from the network segment has, and having at least one distribution node which comprises a plurality of input/output interfaces which are each connected to a network segment, the distribution node being embodied to receive the segment telegram on one input/output interface and to transmit it on a further input/output interface in accordance with a routing specification, and wherein the distribution node is further embodied to block the input/output interface on which the segment telegram has been sent for a further send operation if the telegram sequence information associated with the sent segment telegram indicates a priority for the subsequent segment telegram from the network segment with the same routing specification, the value of which higher than the value of the priority of telegrams which are present in the distribution node and are intended for transmission on the input/output interface, in order to send the subsequent segment telegram on the blocked input/output interface after receipt of the subsequent segment telegram from the network segment with the same routing specification.

EXAMPLES

A method for transmitting data in an automation communication network has at least one distribution node, which makes the throughput of telegrams in the distribution node efficient and reduces time delays in the forwarding process of the telegrams.

In an automation communication network, at least one distribution node is provided, which comprises a plurality of input/output interfaces, each of which is connected to a network segment, each network segment having at least one subscriber. The individual network segments are each assigned segment telegrams for processing by the subscriber in the network segment, the segment telegrams having priorities. In addition, the segment telegrams also each have a data field that is embodied to contain telegram sequence information indicating which priority a subsequent segment telegram from the network segment has. The distribution node in the automation communication network is embodied to receive the segment telegram on an input/output interface and to transmit it on a further input/output interface in accordance with a routing specification, the distribution node blocking the input/output interface on which the segment telegram was transmitted for a further transmission operation if the telegram sequence information assigned to the transmitted segment telegram indicates a priority for the subsequent segment telegram from the network segment with the same routing specification, the value of which is higher than the value of the priority of telegrams which are present in the distribution node and are intended for transmission on the input/output interface, in order to transmit the subsequent segment telegram on the blocked input/output interface after receipt of the subsequent segment telegram from the network segment with the same routing specification.

This procedure ensures that high-priority segment telegrams are preferentially forwarded by the distribution node. The telegram sequence information in the segment telegram, which indicates the priority of a subsequent segment telegram from the network segment, may be used to prevent the distribution node from starting the transmission process with a low-priority segment telegram on the input/output interface during the time interval that occurs between successive segment telegrams until the distribution node may determine the value of the priority of the segment telegram on the basis of the tag field having the priority information in the segment telegram. This is because the distribution node already knows the value of the priority of a subsequent segment telegram from the same network segment during the transmission process of a segment telegram and may thus block a further transmission process on the input/output interface in advance until the subsequent segment telegram may be transmitted. The transmission process for the subsequent segment telegram may always be started immediately by the distribution node without the transmission process for a lower-priority segment telegram first having to be interrupted.

The distribution node may unblock the input/output interface for a further transmission if the one segment telegram with the routing specification for transmitting is received on the input/output interface, the priority of which corresponds at least to the value of the priority that has been indicated to the distribution node in the most recently sent segment telegram as the priority for the subsequent segment telegram from the network segment with the same routing specification.

By means of this procedure, further optimization during data transmission is achieved by cancelling an undesired blocking of an input/output interface of the distribution node when a segment telegram is received in the distribution node, the priority of which has at least the same value as the priority for the subsequent segment telegram on the basis of which the input/output interface has been blocked.

The automation communication network may be a master-slave system, with one subscriber being a master subscriber and the subscribers in the network segments being slave subscribers. The segment telegrams are transmitted and processed on a closed data transmission path starting from the master subscriber on an outward path via the distribution node to the assigned network segment having the slave subscriber addressed by the segment telegram, and return to the master subscriber on a return path via the distribution nodes.

The master node may determine the telegram sequence information in the transmitted segment telegram that indicates the priority for the subsequent segment telegram. Alternatively, the distribution node may determine the telegram sequence information in the transmitted segment telegram, which indicates the priority for the subsequent segment telegram, on the outward path.

Within the framework of a master-slave system in which the segment telegrams circulate on a closed data transmission path, the telegram sequence information that indicates the priority of the subsequent telegram may thus easily be specified in the transmitted telegram. This may be carried out by means of the master subscriber when generating the segment telegrams, since the master subscriber knows the priority information for a segment telegram sequence from the control program running on the master subscriber.

However, it is also possible for the distribution node to enter the telegram sequence information into the segment telegram during transmission on the outward path, i.e. when the segment telegram is output on the network segment, if the distribution node knows the priority of the subsequent segment telegram at the time of transmission. This may e.g. be the case if the subsequent segment telegram to be output on the same network segment has already been received by the distribution node at the time the segment telegram is sent, or the part of the subsequent segment telegram in which the priority is specified. The distribution node usually has a memory unit for this purpose, which is embodied centrally or may also be assigned to the individual input/output interfaces, in which the distribution node then temporarily stores segment telegrams if the input/output interface on which the segment telegram is to be output is blocked by a transmission process.

However, the distribution node may also, if the distribution node outputs a segment telegram on the outward path in accordance with the routing specification via an input/output interface to the assigned network segment, read out the priority of the segment telegram and store it in the memory unit. The distribution node thus knows the priorities of the segment telegrams circulating one after the other in a network segment and may then, after receiving a segment telegram on the return path, enter the priority of the subsequent segment telegram known to the distribution node into the received segment telegram as telegram sequence information.

The structure of the segment telegram may include a header section, a data section, and an end section, the end section comprising a data field indicating the priority for the subsequent segment telegram on the network segment.

The segment telegram structure with the data field, which indicates the priority for the subsequent segment telegram on the network segment, in the end section of the segment telegram allows for entering the priority information into the segment telegram at the latest possible time. This is particularly advantageous if the priority of the subsequent telegram is not yet available at the start of the transmission process. The transmission process for the segment telegram may then already be started. The telegram sequence information which indicates the priority of the subsequent segment telegram and is not known until later may then be entered into the end section of the segment telegram that has not yet been transmitted at this time during the transmission process.

Furthermore, the header section of the segment telegram may have a data field indicating the priority of the segment telegram.

The segment telegram may comprise a data area with datagrams which are assigned to the individual subscribers in the network segment and which each have control data and user data, the control data informing the subscriber on how it should process the user data of the datagram.

The advantageous embodiments and further developments of the invention explained above and/or indicated in the subclaims may be used individually or in any combination with one another except e.g. in cases of clear dependencies or incompatible alternatives.

BRIEF DESCRIPTION OF THE DRAWINGS

The invention will be discussed in more detail below on the basis of figures. Here, in a schematic illustration in each case.

DETAILED DESCRIPTION

It is pointed out that the figures are merely schematic and not to scale. Furthermore, it is pointed out that the reference numerals in the figures have been chosen to be unchanged if they refer to identically embodied elements and/or components and/or sizes.

The following describes a method for transmitting data in a communication network that may e.g. be used in manufacturing, building and process automation. The specification of use is not to be understood as restrictive. The method may be used in any communication network with a distribution node that interconnects a plurality of network segments.

Communication networks for use in automation technology are usually implemented as field-bus systems, in which the sensors and actuators in the communication network exchange data with control units via a field bus. In the field-bus system, this purpose is usually fulfilled by real-time capable network protocols.

Frequently, data exchange between the subscribers on the field bus is carried out on the basis of the master-slave principle. The active bus subscribers, also referred to as master subscribers, correspond to the control units that determine and coordinate the transmission of data on the field bus. The passive bus subscribers, which are referred to as slave subscribers and do not have their own bus access authorization, are the sensors and actuators of the machine periphery. This means that a slave subscriber may only receive messages, acknowledge them and transmit data or telegrams at the request of the master subscriber.

To initiate a cyclic control process in the automation communication network, the master subscriber transmits the output data determined by the master subscriber from input data by means of a control task in the form of a telegram on the field bus. The slave subscribers then take the output data assigned to them from the circulating telegram. At the same time, the slave subscribers insert their input data into the circulating telegram in order to transmit the input data to the master subscriber. The master subscriber then uses the received input data to calculate output data for the next cyclic control process by means of the control task.

Field-bus systems based on the master-slave principle may be operated by means of different network protocols. The Ethernet protocol is the most widely used network protocol. Ethernet telegrams may comprise a user data block having a length of 1500 bytes and enable telegram transmission rates of several gigabytes/second. When using the Ethernet protocol in industrial production plants or machines for control purposes, the real-time capability of the Ethernet protocol must be ensured.

The EtherCAT protocol represents an example for such a protocol, which is based on the Ethernet protocol technology and may be used in real-time capable automation systems. The special feature of the EtherCAT protocol is that the processing of the data in the telegram is carried out by the slave subscribers during the pass-through of the telegram and thus essentially without delay.

The EtherCAT telegram comprises datagrams that are assigned to the individual slave subscribers and that each have control data and user data. The control data inform the slave subscriber on how it should process the user data of the datagram, i.e. whether a read, a write or a combined read/write operation should be executed by the slave subscriber.

The invention is in the following described on the basis of a telegram traffic based on the EtherCAT protocol. However, another network protocol, preferably a real-time Ethernet protocol, may be used for the invention, as well. The invention is further described for a communication network having a hierarchical master-slave structure, but is not limited to such a communication structure.

In order to shorten the circulation times of the telegrams, automation communication networks are often divided up into network segments, with the individual network segments being connected to one another by means of distribution nodes, referred to as "switches". The distribution nodes comprise a plurality of input/output interfaces, each of which may be connected to a network segment or to another distribution node. The distribution node is embodied to receive telegrams on a further input/output interface and to send them on a further input/output interface. The telegrams assigned to the individual network segments are in the following also referred to as segment telegrams.

In order to guarantee the real-time capability of the automation communication network in particular, priorities may also be assigned to the segment telegrams, on the basis of which the distribution nodes then forward the segment telegrams with priority. The priority information is usually contained in the header section of the segment telegram. However, if the distribution node has already started a transmission process via the input/output interface with a segment telegram that has a lower valence (or value) compared to the determined priority before determining the priority of a segment telegram, the forwarding of the high-priority segment telegram is delayed until the transmission process of the low-priority segment telegram is completed.

The distribution node may have the functionality of cancelling or interrupting the transmission of a low-priority segment telegram when a high-priority segment telegram is received, in order to start transmission of the high-priority segment telegram instead. However, canceling or interrupting the transmission of the low-priority segment telegram also causes a delay in forwarding the high-priority segment telegram.

To avoid such delays, the following procedure is selected: segment telegrams are assigned to each of the individual network segments for processing by the subscriber in the network segment, the segment telegrams having priorities. The segment telegrams also have a data field that is embodied to contain telegram sequence information that indicates which priority a subsequent segment telegram from the network segment has. The distribution node in the automation communication network is then configured to receive the segment telegram on an input/output interface and to transmit it according to a routing specification on a further input/output interface, the distribution node blocking the input/output interface on which the segment telegram was transmitted for a further transmission operation, if the telegram sequence information associated with the transmitted segment telegram indicates a priority for the subsequent segment telegram from the network segment with the same routing specification, the valence (or value) of which is higher than the valence (or value) of the priority of telegrams which are present in the distribution node and are intended for transmission on the input/output interface, in order to send the subsequent segment telegram on the blocked input/output interface after receipt of the subsequent segment telegram from the network segment with the same routing specification.

By means of this procedure, telegram traffic via the distribution nodes in the automation communication network may be optimized by giving priority to higher-priority segment telegrams forwarded by the distribution node.

Figure 1:
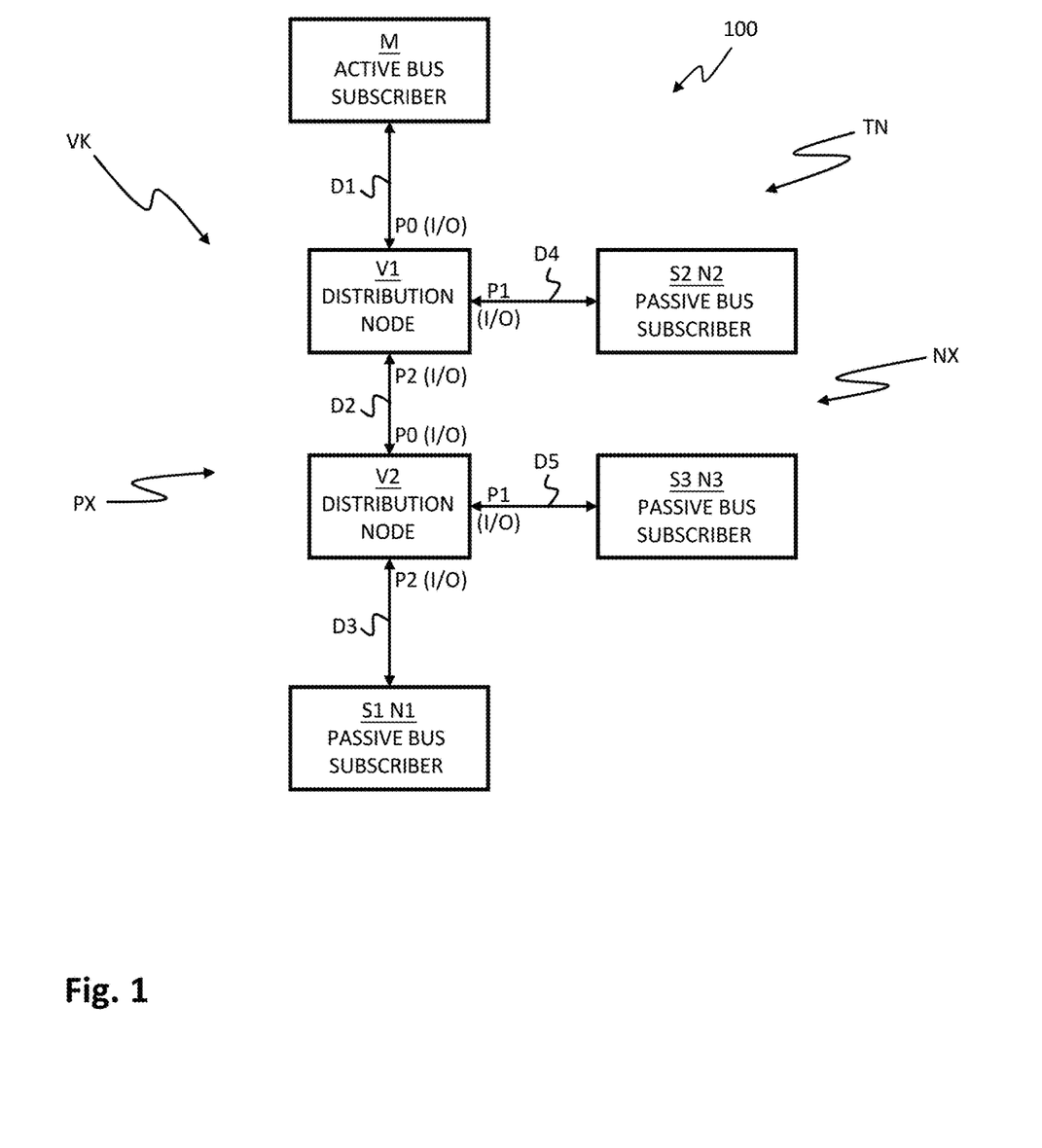
FIG. 1 shows a schematic diagram of the structure of an automation communication network having a plurality of distribution nodes and network segments.

FIG. 1 shows a schematic structure of an automation communication network 100 having a hierarchical architecture that includes subscribers TN, distribution nodes VK, and network segments NX. The elements commonly referred to as subscriber TN are embodied as an active bus subscriber M, a first passive bus subscriber S1, a second passive bus subscriber, and a third passive bus subscriber S3 in the exemplary embodiment of FIG. 1. The elements generally referred to as distribution node VK are embodied as a first distribution node V1 and a second distribution node V2 in the exemplary embodiment of FIG. 1.

Each distribution node VK comprises a plurality of input/output (I/O) interfaces PX via which telegrams may be received and transmitted. In the exemplary embodiment of FIG. 1, both the first distribution node V1 and the second distribution node V2 each comprise a first input/output (I/O) interface P0, a second input/output (I/O) interface P1 and a third input/output (I/O) interface P2.

The elements generally referred to as network segment NX are embodied as a first network segment N1, a second network segment N2, and a third network segment N3 in the exemplary embodiment of FIG. 1.

The topology of the automation communication network 100 provides that a master subscriber M is connected to a first input/output interface P0 of the first distribution node V1 via a first data transmission link D1. The first distribution node V1 is connected to a first input/output interface P0 of the second distribution node V2 via a third input/output interface P2 of the first distribution node V1 and a second data transmission link D2.

A third input/output interface P2 of the second distribution node V2 connects the second distribution node V2, via a third data transmission link D3, to a first network segment N1 comprising a first slave subscriber S1. In addition to the shown first slave subscriber S1 in the first network segment N1, the first network segment N1 may have further slave subscribers.

A second input/output interface P1 of the first distribution node V1 connects the first distribution node V1, via a fourth data transmission link D4, to a second network segment N2, which has a second slave subscriber S2. In addition to the second slave subscriber S2 shown in the second network segment N2, the second network segment N2 may comprise further slave sub scribers.

The second distribution node V2 is connected to a third network segment N3, comprising a third slave subscriber S3, via a fifth data transmission link D5 by means of a second input/output interface P1 of the second distribution node V2. In addition to the shown third slave subscriber S3 in the third network segment N3, the third network segment N3 may have further slave subscribers.

Instead of the structure of the automation communication network 100 shown in FIG. 1 having two distribution nodes VK, i.e. the first distribution node V1 and the second distribution node V2, more or fewer distribution nodes VK may of course be provided. Also, the number of input/output interfaces PX of the distribution nodes VK may differ from the described number of input/output interfaces PX. Furthermore, it is conceivable to implement the automation communication network 100 with a larger or smaller number of network segments NX and/or master subscribers M and slave subscribers, respectively.

Figure 2:
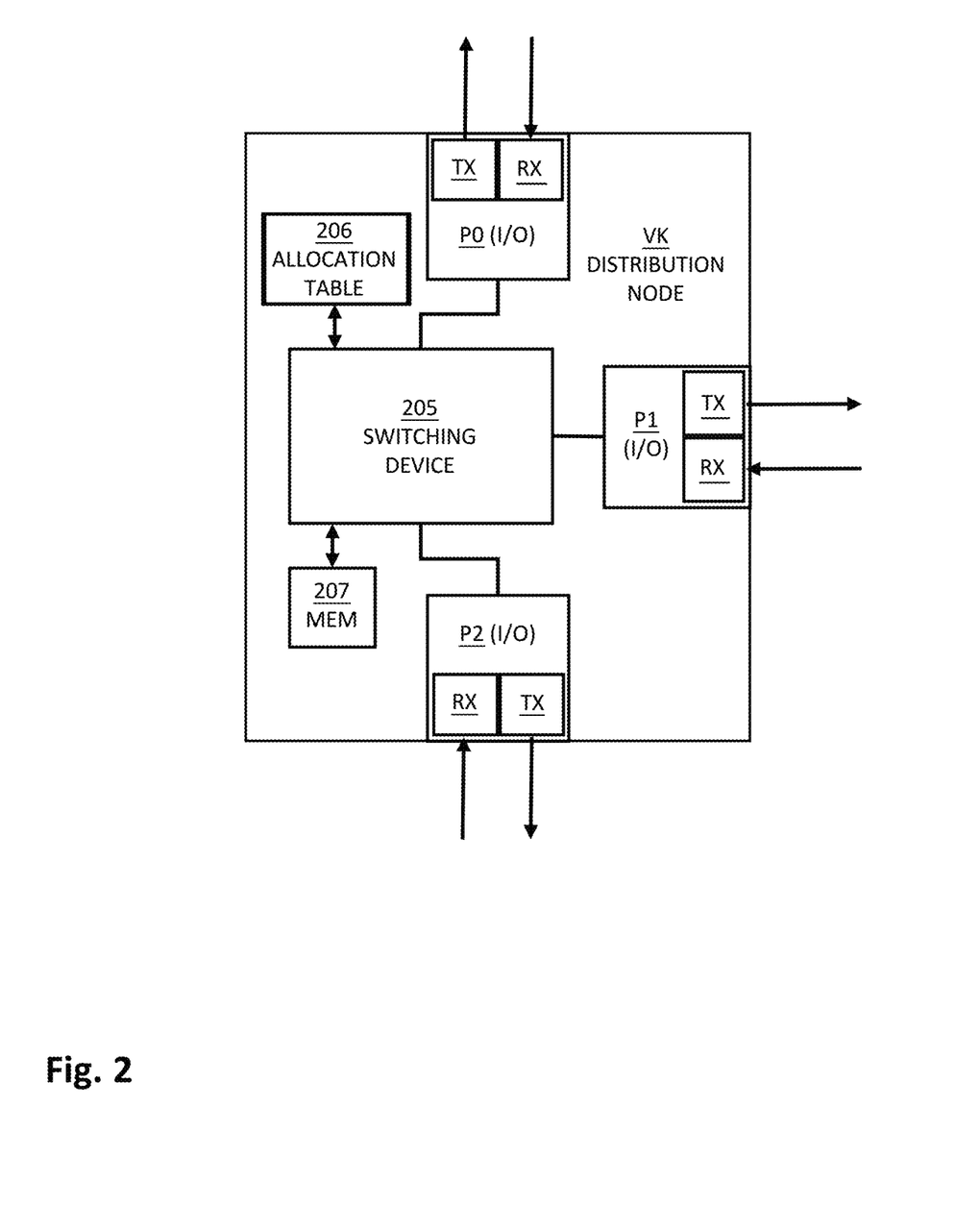
FIG. 2 shows a schematic depiction of a distribution node from FIG. 1.

FIG. 2 shows, in schematic view, the structure of the distribution node VK corresponding to a first distribution node V1 or a second distribution node V1 in FIG. 1. The three first to third input/output interfaces P0, P1, P2 are each connected to a switching device 205 that controls the operation of the distribution node VK. Each of the first to third input/output interfaces P0, P1, P2 has a receiving unit RX and a transmitting unit TX, with arrows in FIG. 2 indicating the respective direction of data transmission.

To control the telegram traffic by means of the distribution node VK, the switching device 205 is connected to an allocation table 206, further referred to as routing list, and to a memory unit 207. For each segment telegram used in the automation network 100, the allocation table 206 contains at least one telegram identifier and the transmitting unit TX of an assigned first to third input/output interface P0, P1, P2. Furthermore, depending on the network protocol used, the allocation table 206 may comprise further information on the individual segment telegrams, such as the transmission time, the receiving unit RX of a first to third input/output interface P0, P1, P2 and the receipt time.

When a telegram is received via the receiving unit RX of a first to third input/output interface P0, P1, P2, the switching device 205 in the distribution node VK detects the telegram identifier in the received segment telegram and compares the detected telegram identifier with the entries in the allocation table 206. The switching device 205 then outputs the segment telegram according to the specification in the allocation table 206 via the transmitting unit TX of the assigned first to third input/output interfaces P0, P1, P2 noted for the telegram identifier in the allocation table 206.

If the first to third input/output interfaces P0, P1, P2 on which a segment telegram is to be output is blocked by a transmission of a preceding segment telegram, the segment telegram is temporarily stored in the memory unit 207. The memory unit 207 may be embodied in such a way that each of the first to third input/output interfaces P0, P1, P2 is assigned a separate memory area in which the segment telegrams to be transmitted on the respective first to third input/output interfaces P0, P1, P2 are temporarily stored in the event of a first to third input/output interface P0, P1, P2 being blocked by a transmission.

The segment telegrams further comprise a data field in which a priority value is encoded. This data field is generally included in the header section of the segment telegram to enable the switching device 205 in the distribution node VK to evaluate the priority information at an early stage.

The switching device 205 of the distribution node VK may further be embodied to interrupt transmission of a lower-prioritized segment telegram on a first to third input/output interface P0, P1, P2 when a higher-prioritized segment telegram is received that is to be transmitted on the same first to third input/output interface P0, P1, P2 according to the routing specification. This may be done in such a way that the distribution node VK buffers the interrupted segment telegram in the memory unit 207 with allocation to the corresponding first to third input/output interfaces P0, P1, P2 and then restarts transmission again after the high-priority segment telegram has been transmitted.

Alternatively, the switching device 205 of the distribution node VK may also be embodied to terminate the interrupted segment telegram defined as a first fragment by sending a first fragmentation information at the end of the fragment. The remaining portion of the low priority segment telegram that has not yet been sent by the distribution node VK then forms a second fragment that is temporarily stored in the memory unit 207. The switching unit 205 of the distribution node VK thereby generates a second fragmentation information for the temporarily stored second fragment. After sending the segment telegram with the higher priority on the associated first to third input/output interfaces P0, P1, P2, the switching device 205 of the distribution node VK then sends the lower-prioritized second telegram fragment together with the second fragmentation information on the associated first to third input/output interfaces P0, P1, P2. The subscriber TN addressed by the low-priority segment telegram then reassembles the first and second fragments of the segment telegram on the basis of the first and second fragmentation information when it receives them.

This procedure allows for optimized data transmission in which high-priority segment telegrams are transmitted preferentially. If fragmentation is provided, it is at the same time ensured that the part of the low-priority segment telegram that has already been transmitted is not lost, which improves the bandwidth of the transmission.

The segment telegrams further comprise a data field which is embodied to contain telegram sequence information indicating which priority a subsequent segment telegram from the network segment NX has. The switching device 205 of the distribution node VK evaluates the data field containing the telegram sequence information when the segment telegram is received. If the indicated priority of the subsequent segment telegram, to which the same routing specification is allocated, indicates a value that is higher than the value of the priority of segment telegrams stored in the storage unit 207 in the distribution node VK for the assigned first to third input/output interfaces P0, P1, P2 on which the segment telegram is output, the switching unit 205 in the distribution node VK blocks a further transmission process on the associated first to third input/output interfaces P0, P1, P2 after the segment telegram has been transmitted. The blocking of the associated first to third input/output interfaces P0, P1, P2 for a further transmission is removed when the subsequent segment telegram has then been received, in order to then forward this segment telegram on the associated first to third input/output interfaces P0, P1, P2.

The distribution node VK may also be embodied to unblock the associated first to third input/output interfaces P0, P1, P2 for a further transmission process when a segment telegram with the routing specification for transmission is received on the associated first to third input/output interfaces P0, P1, P2, the priority of which corresponds at least to the value of the priority that the distribution node VK has been indicated in the most recently transmitted segment telegram as the priority for the subsequent segment telegram from the network segment NX.

By being able to determine the priority of a subsequent segment telegram on the basis of the telegram sequence information in the segment telegram, the distribution node VK may ensure that a telegram sequence consisting of high-priority segment telegrams is forwarded without delay. In this way, it may be ensured, in particular in real-time capable automation communication networks 100, that cyclic telegrams which transmit control data are passed through without delay.

Data transmission in the automation communication network 100 shown in FIG. 1 is based on the EtherCAT protocol. Alternatively, however, another known real-time capable network protocol may also be used. The segment telegrams used for transmitting data circulate in the automation communication network 100 on a closed data transmission path. The depiction of the first to fifth data transmission paths D1-D5 selected in FIG. 1 with double arrows indicates that bidirectional data transmission takes place on an outward path and on a return path. Starting from the master subscriber M, the segment telegrams are transmitted and processed via the first and second distribution nodes V1, V2 to the assigned first to third network segment N1, N2, N3 with the first to third slave subscriber S1, S2, S3 addressed by the segment telegram on the outward path. The segment telegrams then return via the first and second distribution nodes V1, V2 to the master subscriber M on the return path.

Figure 3:
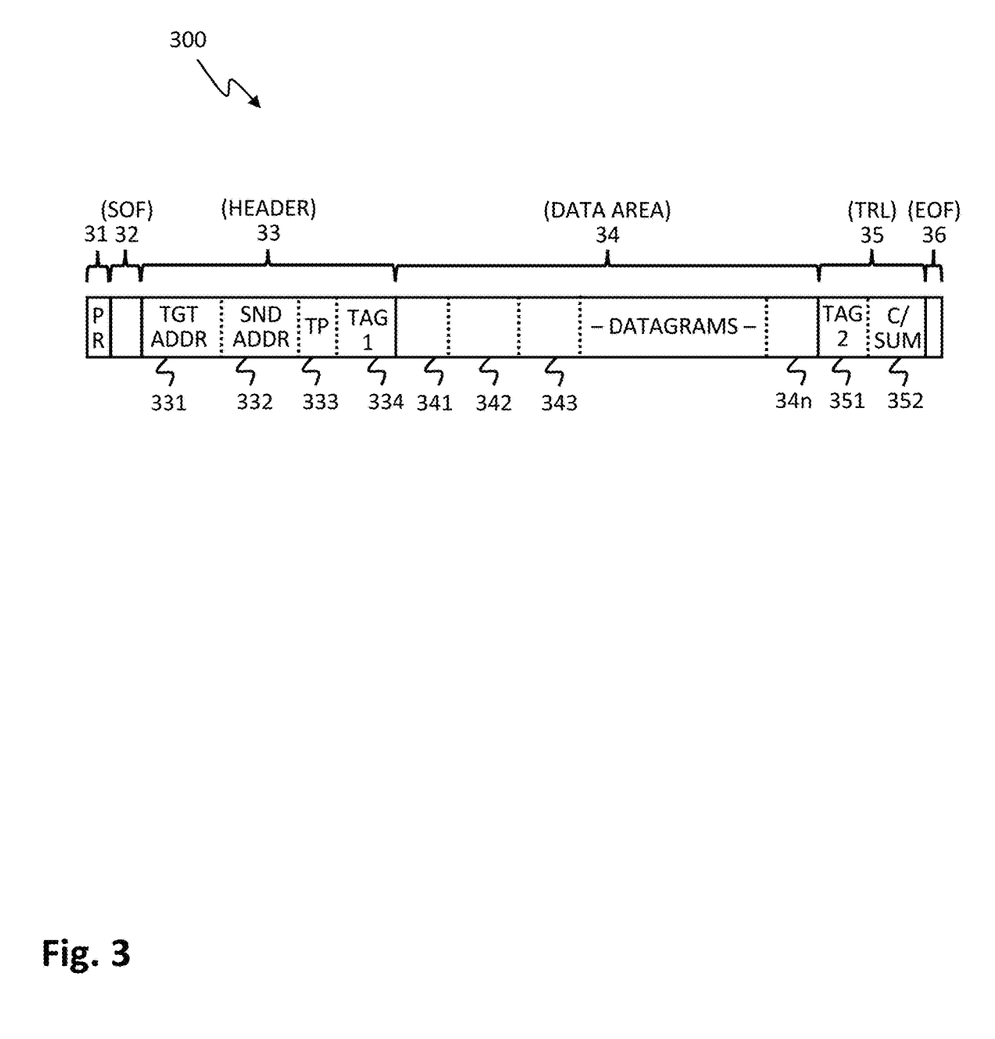
FIG. 3 shows an EtherCAT telegram structure.

FIG. 3 schematically shows the structure of a segment telegram 300 embodied as an EtherCAT telegram with a tag extension by means of which the segment telegram 300 may be prioritized during transmission. The segment telegram 300 has a data area 34 with a length of up to 1500 bytes, which is encapsulated by a header section, which may generally also be referred to as header 33, and an end section, the so-called trailer (TRL) 35

The data area 34 comprises datagrams 341-34n, which are assigned to the individual slave subscribers in the network segment and which each have control data and user data. The control data informs the slave subscriber how the slave subscriber is to process the user data of the datagram, i.e. whether a read, a write or a combined read/write operation is to be performed by the slave subscriber.

The header 33 is preceded by a 7 byte long preamble (PR) 31 which is used for synchronization and a 1 byte long start identifier 32 for the actual telegram, referred to as a start of frame delimiter, SOF. The header 33 comprises 18 bytes and consists of a 6-byte target address field (TGT ADDR) 331, a 6-byte sender address field (SND ADR) 332, a 2-byte type field (TP) 333 and a 4-byte first tag field (TAG 1) 334. The type field 333 indicates the telegram type, i.e. the protocol of the next higher processing layer. Further control information, including the priority value of the segment telegram, is then coded in the first tag field 334.

As an alternative to the first tag field 334, which contains the priority value of the segment telegram, the priority value may, however, also be displayed at another position in the header 33 and e.g. be encoded in the target address field 331 or in the sender address field 332.

The trailer 35 at the end of the segment telegram is 5 bytes long and has a 1 byte long second tag field (TAG 2) 351 and a 4 byte long checksum field (C/SUM) 352. Further control information is encoded in the second tag field 351. This further control information includes, among other things, the priority value of the next segment telegram from the allocated network segment following the segment telegram.

The checksum field 352 comprises a checksum. The calculation of the checksum performed by the sending subscriber starts with the target address field 331 and ends with the second tag field 351. The preamble 31 and the start identifier 32 are not included in the checksum. Based on the checksum, the subscriber acting as the receiver repeating the calculation may then determine whether the transmission was error-free by comparing the two values. A control symbol 36, referred to as End of Frame EOF, is added to the end of the segment telegram to indicate completion of the telegram.

Due to the segment telegram structure, in which the second tag field 351 is provided at the end of the segment telegram in order to include the telegram sequence information indicating which priority the following segment telegram has, the telegram sequence information to be entered into the segment telegram need not already be available at the beginning of a transmission process of the segment telegram. The telegram sequence information, if it does not become known until a time when the transmission process for the segment telegram is already in progress, for example, may still be subsequently entered into the second tag field 351 in the trailer 35 of the segment telegram, as long as the trailer 35 has not yet been forwarded. The fact that the priority of the subsequent segment telegram on the network segment has not yet been determined at the time the segment telegram is sent may in particular apply if the distribution node is to carry out the entry of the telegram sequence information.

Entry of the telegram sequence information by the distribution node is particularly useful if data transmission in the network segment takes place on a closed data transmission path, such as in a master-slave system. The segment telegram received by the distribution node from the master subscriber is output by the distribution node to the allocated network segment in accordance with the routing specification via the corresponding input/output interface. After processing by the slave nodes in the network segment, the distribution node then receives the segment telegram again on the input/output interface and sends the segment telegram back to the master node.

In this case, the distribution node may be embodied to enter the telegram sequence information into the second tag field 351 of the segment telegram on the outward path if the distribution node has already received the subsequent segment telegram and determined its priority from the first tag field 343 prior to sending out the second tag field 351 of the segment telegram.

Also, the distribution node may determine the priority of the subsequent segment telegram from the memory unit if the memory area associated with the input/output interface contains another segment telegram to be sent after the segment telegram. The priority of the segment telegram stored in the memory area of the memory unit that is to be sent as the subsequent segment telegram is then entered by the distribution node into the second tag field 351 of the segment telegram currently to be sent.

In addition or as an alternative, the distribution node may be embodied to buffer the priorities of the segment telegrams transmitted one after the other on the forward path in connection with the respective segment telegram identifier, in order to then, upon receipt of a segment telegram on the return path, allocate the priority of the subsequent segment telegram passing through the network segment to the segment telegram as telegram sequence information and, as the case may be, to enter it into the second tag field 351 of the segment telegram, if the telegram sequence information could not yet be entered onto the forward path.

As an alternative to defining the telegram sequence information in the segment telegram by the distribution node, in a master-slave system the master subscriber may also determine the telegram sequence information that indicates the priority for the subsequent segment telegram. If the transmitted segment telegrams are cyclic telegrams with control data, the master node knows the sequence of the segment telegrams due to the control task and may thus enter the telegram sequence information in the second tag field 351 when sending the segment telegram.

Depending on the embodiment of the automation communication network and the network protocol used in it, it is also possible that another subscriber that knows the telegram sequence information for the segment telegrams enters the telegram sequence information indicating the priority of the subsequent segment telegram into the segment telegram.

In the following, a data transmission in the automation communication network 100 shown in FIG. 1 using segment telegrams, the structure of which is shown in FIG. 3, is described with reference to FIG. 4.

Figure 4:
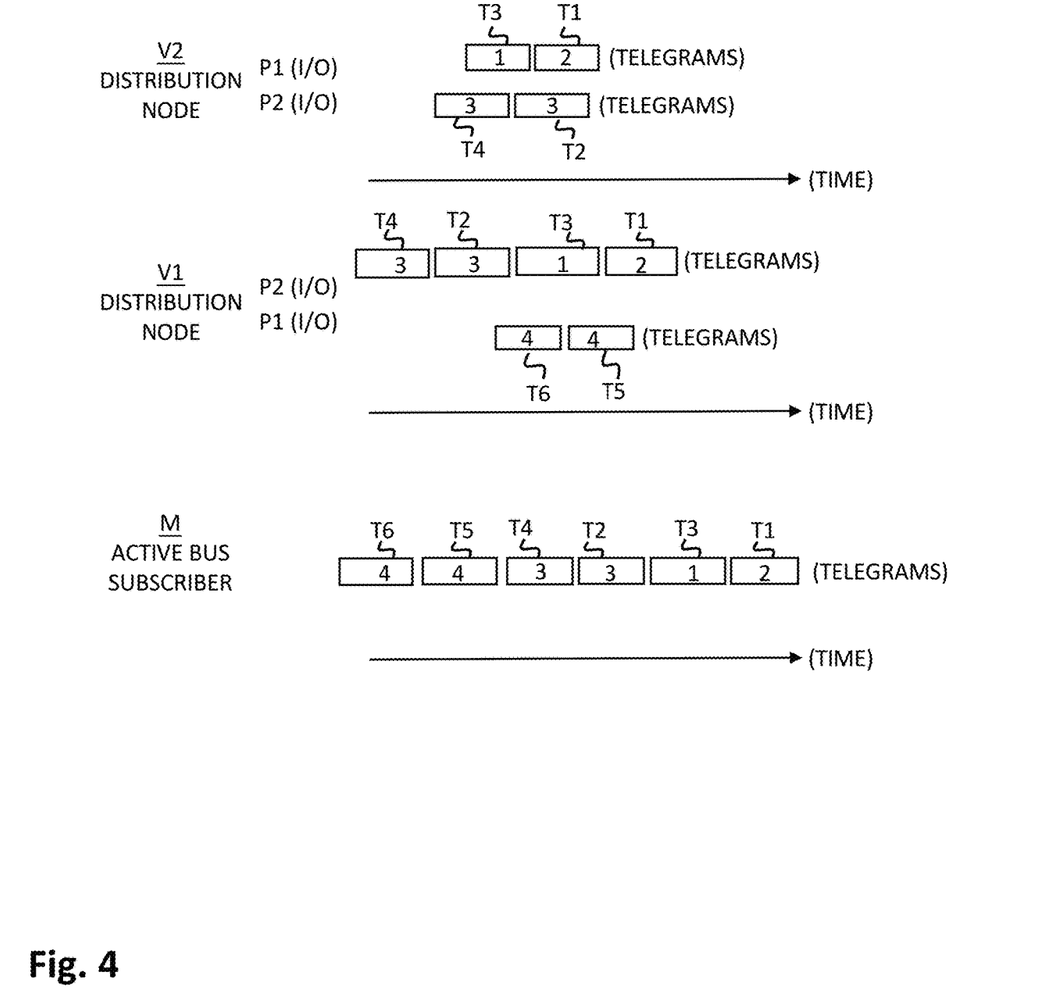
FIG. 4 shows a time line of a data transmission in the automation communication network according to FIG. 1 in the form of telegrams with the EtherCAT telegram structure shown in FIG. 2.

In FIG. 4, an arrow indicates a time axis, with time advancing in the direction of the arrowhead. FIG. 4 further shows, from top to bottom, segment telegram sequences that are present at a certain time at the second distribution node V2 at the second input/output interface P1 and the third input/output interface P2, at the first distribution node V1 at the third input/output interface P2 and the second input/output interface P1, and at the input of the master subscriber M.

The individual segment telegrams are each assigned a priority, which in FIG. 4 is entered as a number in the respective telegram block. Four priority values are provided, priority value 1 representing the highest priority and priority value 4 the lowest priority.

It is assumed that a first telegram sequence having a first segment telegram T1, which has priority 2, and a subsequent third segment telegram T3, which has priority 1, is received by the second input/output interface P1 of the second distribution node V2 of the third network segment N3. Furthermore, a second telegram sequence consisting of a second segment telegram T2 and a subsequent fourth segment telegram T4 is present at the third input/output interface P2 of the first network segment N1. Both second and fourth segment telegrams T2, T4 of the second telegram sequence are assigned priority 3.

The first telegram sequence from the first and third segment telegrams T1, T3 on the second input/output interface P1 of the second distribution node V2 is received, as shown in FIG. 4, on the third input/output interface P2 of the second distribution node V2 prior to the second telegram sequence from the second and fourth segment telegrams T2, T4, wherein the second segment telegram T2 of the second telegram sequence with priority 3 is received prior to the subsequent third segment telegram T3 of the first telegram sequence with priority 1.

The first to fourth segment telegrams T1 to T4 of the two telegram sequences each have a second tag field 351 into which the priority of the subsequent telegram is entered. Thus, in the first segment telegram T1 of the first telegram sequence having priority 2, priority 1 of the subsequent third segment telegram T3 is entered as telegram sequence information. Since the third segment telegram T3 does not have a subsequent segment telegram, no telegram sequence information is provided here. In the second segment telegram T2 of the second telegram sequence having priority 3, priority 3, which the subsequent fourth segment telegram T4 has, is again entered as telegram sequence information in the second tag field 351. Since the fourth segment telegram T4 does not have a subsequent segment telegram, no telegram sequence information is provided here.

Due to the master-slave structure, the first input/output interface P0 of the second distribution node V2 is provided as routing information for the first to fourth segment telegrams T1 to T4 of both telegram sequences in the allocation table 206 of the second distribution node V2. Since the first segment telegram T1 of the first telegram sequence was received as the earliest segment telegram on the second input/output interface P1 of the second distribution node V2 and no other segment telegram with a higher priority is present, the first segment telegram T1 of the first telegram sequence in the second distribution node V2 is forwarded directly to the first input/output interface P0 of the second distribution node V2.

As the next segment telegram, the third segment telegram T3 of the first telegram sequence having priority 1 is output by the second distribution node V2 to the first input/output interface P0 of the second distribution node V2. The third segment telegram T3 of the first telegram sequence was received on the second input/output interface P1 of the second distribution node V2 after the second segment telegram T2 of the second telegram sequence on the third input/output interface P2 of the second distribution node V2. However, due to the telegram sequence information allocated to the first segment telegram T1 of the first telegram sequence indicating priority 1 for the subsequent third segment telegram T3 of the first telegram sequence, the second distribution node V2 has blocked the first input/output interface P0 of the second distribution node V2 for transmission after forwarding the first segment telegram T1 of the first telegram sequence, since the priority of the subsequent third segment telegram T3 of the first telegram sequence with 1 has a higher value than the already received second segment telegram T2 of the second telegram sequence with priority 3.

FIG. 4 then further shows a third telegram sequence that the first distribution node V1 receives on the third input/output interface P2 of the first distribution node V1, which is connected to the first input/output interface P0 of the second distribution node V2 via the second transmission link D2. The third telegram sequence with the sequence first segment telegram T1 having priority 2, the third segment telegram T3 having priority 1, the second segment telegram T2 having priority 3 and the fourth segment telegram T4 having priority 3 is present at the third-input/output interface P2 of the first distribution node V1, having been forwarded via the first input/output interface P0 of the second distribution node V2. The priority of the following segment telegram is in this context entered into the second tag field 351 in the segment telegrams.

In time after the third telegram sequence, a fourth telegram sequence consisting of a fifth segment telegram T5 and a subsequent sixth segment telegram T6 is received by the first distribution node V1 on the second input/output interface P1 of the first distribution node V1 from the second network segment N2, wherein both fifth and sixth segment telegrams T5, T6 are assigned priority 4. In the fifth segment telegram T5 of the fourth telegram sequence, priority 4, which is assigned to the subsequent sixth segment telegram T6, is entered as telegram sequence information in the second tag field 351.

The fourth telegram sequence on the second input/output interface P1 of the first distribution node V1 is received by the first distribution node V1 with a time offset with regard to the third telegram sequence on the third input/output interface P2 of the first distribution node V1 such that the fifth segment telegram T5 of the fourth telegram sequence having priority 4 is received after the first segment telegram T1 of the third telegram sequence having priority 2, but prior to the third segment telegram T3 of the third telegram sequence having priority 1.

Due to the telegram sequence information in the first segment telegram T1 of the third telegram sequence indicating the priority 1 of the subsequent third telegram T3 of the third telegram sequence T3, the subsequent third segment telegram T3 of the third telegram sequence is forwarded on the first input/output interface P0 of the first distribution node V1, to which the third telegram sequence and the fourth telegram sequence are routed in accordance with allocation table 206 in the first distribution node V1, after the first segment telegram T1 of the third telegram sequence although the fifth segment telegram T5 of the fourth telegram sequence was received earlier.

Also, the further second and fourth segment telegrams T2, T4 of the third telegram sequence are transmitted by the first distribution node V1 on the first input/output interface P0 of the first distribution node V1 prior to the fifth segment telegram T5 of the fourth telegram sequence, since the telegram sequence information in the third segment telegram T3 having priority 3 and in the second segment telegram T2 having priority 3 indicates a higher priority than the priority 4 that the fifth segment telegram T5 of the fourth telegram sequence has.

FIG. 4 then shows the fifth telegram sequence transmitted to master subscriber M via data transmission link D1 from the first distribution node V1 with the sequence first segment telegram T1, third segment telegram T3, second segment telegram T2, fourth segment telegram T4, fifth segment telegram T5 and sixth segment telegram T6. As FIG. 4 shows, highly prioritized segment telegrams are returned to the master subscriber M with priority.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for transmitting data in the form of telegrams in an automation communication network comprising at least one distribution node having a plurality of input/output interfaces for communicating with a plurality of network segments,
    wherein each of the network segments comprises at least one subscriber,
    where the network segments are each assigned segment telegrams for processing by the at least one subscriber comprised in the respective network segment,
    where priorities are assigned to the segment telegrams,
    wherein the segment telegrams each have a data field containing telegram sequence information indicating which priority a subsequent segment telegram from the respective network segment has,
    wherein the at least one distribution node is configured to receive the segment telegrams on an input/output interface and to transmit the segment telegrams according to a routing specification on a further input/output interface,
    wherein the at least one distribution node blocks the further input/output interface on which a segment telegram of the segment telegrams was transmitted for a further send operation if the telegram sequence information contained in the data field of the transmitted segment telegram indicates a priority for the subsequent segment telegram from the respective network segment with a same routing specification as the transmitted segment telegram, a value of which is higher than that of the priorities assigned to others of said segment telegrams which are present in the at least one distribution node and are intended for transmission on the further input/output interface, in order to send the subsequent segment telegram on the further input/output interface after receipt of the subsequent segment telegram from the respective network segment with the same routing specification;
    wherein the automation communication network is a hierarchical system comprising an active bus subscriber and the subscribers comprised in the network segments are passive bus subscribers, each of the segment telegrams being transmitted and processed on a closed data transmission path starting from the active bus subscriber on an outward path via the at least one distribution node to an associated network segment comprising a passive bus subscriber of the passive bus subscribers that is addressed by the respective segment telegram and returning to the active bus subscriber on a return path via the at least one distribution node.

2. The method according to claim 1, wherein the at least one distribution node unblocks the further input/output interface for a further transmission process when a segment telegram of the segment telegrams with the routing specification for transmission in accordance thereto is received on the input/output interface, the priority of which corresponds at least to the value of the priority that has been indicated to the at least one distribution node in the transmitted segment telegram as priority for the subsequent segment telegram from the respective network segment with the same routing specification.

3. The method according to claim 1, wherein the active bus subscriber determines the telegram sequence information contained in the data field of the transmitted segment telegram, indicating the priority for the subsequent segment telegram.

4. The method according to claim 1, wherein the at least one distribution node determines the telegram sequence information contained in the data field of the transmitted segment telegram, indicating the priority for the subsequent segment telegram on the outward path.

5. A non-transitory data storage medium having a segment telegram stored in program code thereon, the program code being executable by a computer processor and the segment telegram comprising a header section, a data area, and an end section, wherein the end section comprises a data field indicating a priority for a subsequent segment telegram on a network segment,
- wherein at least one distribution node is configured to receive the segment telegram on an input/output interface and to transmit the segment telegram according to a routing specification on a further input/output interface; and
- wherein the at least one distribution node blocks the further input/output interface on which the segment telegram of the segment telegrams was transmitted for a further send operation if the telegram sequence information contained in the data field of the transmitted segment telegram indicates a priority for the subsequent segment telegram from the respective network segment with a same routing specification as the transmitted segment telegram, a value of which is higher than that of the priorities assigned to other segment telegrams which are present in the at least one distribution node and are intended for transmission on the further input/output interface, in order to send the subsequent segment telegram on the further input/output interface after receipt of the subsequent segment telegram from the respective network segment with the same routing specification;
- wherein the automation communication network is a hierarchical system comprising an active bus subscriber and the subscribers comprised in the network segments are passive bus subscribers, each of the segment telegrams being transmitted and processed on a closed data transmission path starting from the active bus subscriber on an outward path via the at least one distribution node to an associated network segment comprising a passive bus subscriber of the passive bus subscribers that is addressed by the respective segment telegram and returning to the active bus subscriber on a return path via the at least one distribution node.

6. The non-transitory data storage medium having a segment telegram stored in program code thereon according to claim 5, wherein the header section comprises a data field indicating priority of the segment telegram.

7. The non-transitory data storage medium having a segment telegram stored in program code thereon according to claim 5, wherein the data area comprises datagrams which are assigned to individual subscribers in the network segment, and which datagrams each have control data and user data, the control data informing the individual subscribers in which way to process the user data of the datagrams.

8. An automation communication network comprising:
a plurality of network segments each having at least one subscriber,
wherein the network segments are each assigned segment telegrams for processing by the at least one subscriber comprised in the respective network segment,
wherein priorities are assigned to the segment telegrams,
wherein the segment telegrams each have a data field containing telegram sequence information indicating which priority a subsequent segment telegram from the respective network segment has; and
at least one distribution node which comprises a plurality of input/output interfaces which are each connected to at least one of the network segments, the at least one distribution node being configured to receive the segment telegrams on one of the input/output interfaces and to transmit the segment telegrams on a further of the input/output interfaces in accordance with a routing specification, and
wherein the at least one distribution node is further configured to block the further input/output interface on which a segment telegram of the segment telegrams has been transmitted for a further send operation if the telegram sequence information contained in the data field of the transmitted segment telegram indicates a priority for the subsequent segment telegram from the respective network segment with a same routing specification as the transmitted segment telegram, a value of which is higher than that of the priorities assigned to others of said segment telegrams which are present in the at least one distribution node and are intended for transmission on the further input/output interface, in order to send the subsequent segment telegram on the further input/output interface after receipt of the subsequent segment telegram from the respective network segment with the same routing specification;
wherein the automation communication network is a hierarchical system comprising an active bus subscriber and the subscribers comprised in the network segments are passive bus subscribers, and
wherein the segment telegrams are each transmitted and processed on a closed data transmission path starting from the active bus subscriber on an outward path via the at least one distribution node to an associated network segment comprising a passive bus subscriber of the passive bus subscribers that is addressed by the respective segment telegram and returning to the active bus subscriber on a return path via the at least one distribution node.

9. The automation communication network according to claim 8, wherein the at least one distribution node is configured to unblock the further input/output interface for further transmission when one of the segment telegrams with the routing specification for transmission in accordance thereto is received on the input/output interface, the priority of which corresponds at least to the value of the priority which has been indicated to the at least one distribution node in the transmitted segment telegram as priority for the following segment telegram from the respectively assigned network segment with the same routing specification.

10. The automation communication network of claim 8, wherein the active bus subscriber is configured to determine the telegram sequence information contained in the data field of the transmitted segment telegram, indicating the priority for the subsequent segment telegram.

11. The automation communication network of claim 8, wherein the at least one distribution node is configured to determine the telegram sequence information contained in the data field of the transmitted segment telegram, indicating the priority for the subsequent segment telegram on the outward path.

* * * * *